United States Patent
Magbie et al.

(10) Patent No.: US 6,657,535 B1
(45) Date of Patent: Dec. 2, 2003

(54) SYSTEM FOR SIGNALING A DEVICE AT A REMOTE LOCATION

(75) Inventors: L. Hugh Magbie, Cambridge, MA (US); James E. Mandry, Lawrence, MA (US); Douglas W. Prince, South Sutton, NH (US)

(73) Assignee: Hawkeye Global, Inc., Salem, NH (US)

( * ) Notice: Subject to any disclaimer, the term of this patent is extended or adjusted under 35 U.S.C. 154(b) by 0 days.

(21) Appl. No.: 09/386,113

(22) Filed: Aug. 30, 1999

Related U.S. Application Data

(60) Provisional application No. 60/098,486, filed on Aug. 31, 1998.

(51) Int. Cl.[7] .............................................. G05B 19/00
(52) U.S. Cl. ................................ 340/5.31; 340/825.49; 342/357.03; 455/12.1; 307/10.1
(58) Field of Search ........................... 340/539, 825.49, 340/5.31; 342/357.03, 357.06, 357.09; 455/12.1; 307/10.1, 10.2, 10.3, 10.6

(56) References Cited

U.S. PATENT DOCUMENTS

| | | | |
|---|---|---|---|
| 4,723,121 A | * | 2/1988 | van den Boom et al. ............ 340/825.31 |
| 5,285,496 A | | 2/1994 | Frank et al. ................... 380/9 |
| 5,490,200 A | | 2/1996 | Snyder et al. ................. 379/57 |
| 5,587,715 A | * | 12/1996 | Lewis ......................... 342/357 |
| 5,588,038 A | | 12/1996 | Snyder ........................ 379/57 |
| 5,631,642 A | * | 5/1997 | Brockelsby et al. ........ 340/993 |
| 5,640,442 A | | 6/1997 | Fitzgerald et al. ............. 379/57 |
| 5,721,550 A | | 2/1998 | Lopez ......................... 341/176 |
| 5,734,963 A | | 3/1998 | Fitzgerald et al. ......... 455/31.2 |
| 5,742,233 A | | 4/1998 | Hoffman et al. ............. 340/573 |
| 5,765,112 A | | 6/1998 | Fitzgerald et al. .......... 455/509 |
| 5,815,093 A | * | 9/1998 | Kikinis ....................... 340/937 |
| 5,905,432 A | | 5/1999 | Greene ....................... 340/426 |
| 5,920,805 A | | 7/1999 | Foladare et al. ........... 455/31.2 |

FOREIGN PATENT DOCUMENTS

WO    WO 97/19547    5/1997

* cited by examiner

Primary Examiner—Michael Horabik
Assistant Examiner—M Shimizu
(74) Attorney, Agent, or Firm—Hamilton, Brook, Smith & Reynolds, P.C.

(57) ABSTRACT

A system for providing protected two-way communication between a shared control database ("base station") and at least one remotely located protector module/remote unit uses a two-way pager system in conjunction with a communications host and a security algorithm. The security algorithm has the capability of producing a time-varying password, say every sixty seconds, and can be made part of a microprocessor housed in the protector module. Each protector module has a unique inherently assigned identification number (ID) which is verified and authenticated by the control database each time a message is received from the remotely located associated protector module. In addition, the system makes sure that each communication between the control database and a remote unit has a component which matches a predetermined electronic identification number (EIN). Data transmission from the remote unit may use a universal asynchronous receiver/transmitter (UART) arrangement or other buffer arrangement for efficient data transmission.

11 Claims, 5 Drawing Sheets

SYSTEM FOR SIGNALING A DEVICE AT A REMOTE LOCATION

RELATED APPLICATIONS

This application claims the benefit of U.S. Provisional Application Serial No. 60/098,486, filed on Aug. 31, 1998, the contents of which are incorporated herein by reference.

BACKGROUND OF THE INVENTION

Systems which are able to locate a stolen vehicle after reporting a theft are commercially available. Invariably in such systems, the effort to locate a stolen vehicle starts from a telephone call from the owner of the stolen vehicle to a control center which sends out a "where are you located?" message to a module which is already installed in the vehicle to be protected. The module, by using its capability as a transmitter sends out signals to the control center regarding its location by using the assistance of a global position sensor or the like. There are yet other systems, which can be installed on a controlled device, e.g., a vehicle, with the capability of turning on/off a power supply with the use of a remote command signal.

SUMMARY OF THE INVENTION

The present invention is directed to a two-way paging system which offers improved functions, including but not limited to tracking, remote control, and anti-theft, and includes certain functions not offered in prior art systems. The present inventive system can be used as a protective system for protecting automobiles against theft, but it has applications beyond automobile theft protection. Such applications include remote monitoring of a physical condition, global position sensing in conjunction with tracking, and telemetry or remote reading of a physical parameter.

If indeed, the protection system is installed on an automobile or a portable unit which is reportedly stolen, and a control center were to initiate a switch to shut off the automobile which may be in motion on a highway, the consequences and the resulting liability could be of paramount magnitude. The present invention addresses this issue by checking the motion status of the vehicle before turning off power supply to the vehicle. Also, in hitherto known protection systems or tracking systems which use a protection module, generally, a query has to be initiated by either the owner of the protection module, or the query has to be initiated by the control center. If neither of the two situations happens and the owner is not aware of an undesirable situation in which the (protection) module is placed, in the absence of the control center initiating an interrogation or a query, no corrective action can be taken. Such situations are overcome in the present invention. In its simplest form, the invention resides in a method of providing vehicle security by using a module installed in the vehicle, and sensing a safe condition to stop the vehicle after the vehicle is known to be misappropriated. An embodiment of the invention described hereinafter includes a control station which may communicate with a communications host, and an end user module which is installed in a unit to be protected/tracked/monitored/controlled, the end user module having functional capabilities depending on the desired application.

If the end user module is installed in a unit which is intended to be protected against theft, for instance, the module can include a gyration sensing unit or a motion sensor depending on a design choice and the specific application. A gyration sensing unit which can be incorporated into the protector can take the form of a sensor which generates a signal responsive to a non-linear arcuate movement of the sensor. Preferably, such a gyration sensing unit should function as desired, independent of the spatial orientation thereof. If a tracking function is desired, the protector module can be provided, for instance, with a global positioning system (GPS) receiver which can operate with an averaging unit which computes an average reading from several selected consecutive position readings for a stationary unit location. Such an averaging unit would be desirable to even out small inherent inaccuracies in GPS-type location readings.

A given control station or base station may be called upon to communicate with several modules remotely located in the field. In such a case, each module has to be identified. To this end, in the present invention, each module has its own inherent identification number, which is the module security ID. The module security ID is verified in this invention by the control station before acknowledging data received from the module. Even though the retention of the module security ID without erasure is dependent on the uninterrupted availability of electrical power (which may be battery power) for the module, means may be provided, placed preferably in the protector module, to resynchronize the security ID when the power is restored after a failure of power supply. Also, preferably any communications between the customer and the control station are authenticated and protected by encryption. Additionally, any communication stream between the module and the control station (or database therein) is protected. Also, preferably, as described hereinafter, a time-varying algorithm which changes the password, say once every sixty (60) seconds, is used to enhance security. The module, if installed to protect an automobile against theft, for example, is referred to herein as a protector module.

The protector module power supply can be AC or from a battery pack or from solar panels on the protector module where the module is exposed to light. Furthermore, where the control station is trying to send a message to a remotely-located module, and where the protector module is shielded temporarily from receiving the control station's message, the present system can use its auto-recovery capability whereby the control station automatically tries to establish contact with the same protector module which was out of reach a short while ago. The protector module includes a suitable antenna (or antennae), as necessary, and may itself initiate contact with the control or base station when power is restored to the module or even otherwise, periodically as desired.

The present inventive system has various applications, which include, but are not limited to the following:
1. Theft control of automobiles and other valuable objects;
2. Remote lighting control or remote on/off control of an appliance or gadget;
3. Remote retrieval of information from a stolen laptop or computer;
4. Use as a modem;
5. Locate livestock or other animals which are suitably tagged;
6. Manage a heating system remotely;
7. Remote control of a manufacturing system from a control station without any control wiring from the control station; and
8. Track a customer's status at a remote location.
9. Track a stolen object which has been removed to a remote location.
10. Turn off ignition to a stolen automobile remotely, after ensuring that it is safe to turn off ignition.

The end user module of the inventive system may include the following:
1. Two-way paging system, e.g., a SkyTelo® paging unit;
2. GPS receiver;
3. Microprocessor based interface and memory;
4. Power supply, with options as to the type of power supply;
5. Several input/output options, such as a motion detector, on/off switches, digital I/O, analog I/O, I/O expansion, bus, keypad, display (e.g., LCD), status indicators, and serial comport; and
6. Sensor options such as temperature, pressure, vibration, mechanical stress, expansion/contraction, noise level, and wind velocity.

In one aspect, the invention resides in a method of providing vehicle security by stopping the vehicle in the event of misappropriation comprising: determining that the vehicle has been misappropriated; sensing a condition of the vehicle to determine a safe condition for stopping the vehicle; and stopping the vehicle dependent on the sensed condition.

In another aspect, the invention provides a method of controlling a device from a control station comprising: providing a controller on the device having an identification code; at both the control station and the device controller, varying a security code for the module through a time varying algorithm applied to the identification code; communicating from the central station to the device controller, a security code being provided in the communication; and responding at the device controller only when the security code at the device controller matches the security code in the communication.

In another aspect, the invention provides a method and system for remotely protecting a vehicle against unauthorized movement, by using a control station and a protection module installed inside the vehicle, the control station and the protection module being capable of remote communication with each other, wherein the control station includes: electronics (i) for interrogating the protection module, (ii) for reading all signals including motion status signals sent by the protection module, (iii) for waiting until such time that a parked condition of the vehicle as sensed by the protector module is signaled by the protector to the control station, and (iv) for remotely incapacitating the vehicle by cutting off power supply thereto by a control signal from the control station through the protection module responsive to the vehicle being sensed to be in a parked condition; said protection module including: electronics to sense a motion condition and a parked condition of the vehicle and to send corresponding signals therefor to said control station; and circuitry to receive control signals from the control center to selectively turn off power to shut down the vehicle.

In another aspect, the invention resides in a method and system for remotely tracking a vehicle as to its location, comprising: an electrically powered remote module installed in the vehicle, said module including: electronics to communicate with a remote control station; a global position sensor (GPS); and a control circuit connected to the GPS and assisting the GPS to continually generate a GPS signal at predetermined time intervals without being interrogated and without being prompted; and a control station which is capable of remote two-way communication with the remote module and receives GPS information from said remote module to generate a log of the vehicle location over a period of time.

The invention, in another aspect, resides in an electrically powered module for installing in a vehicle for remotely protecting the vehicle, said module being capable of two-way communication with a central control station and comprising: a sensor for ascertaining a motion status of the vehicle including as to whether the vehicle is in motion or in a parked condition and for generating corresponding motion status signal; a transmitter/receiver for transmitting/receiving signals and information to/from said central control station; and an on/off switch controlled by electronics to incapacitate and turn off the vehicle in response to a control station signal and in response to the motion status parked condition signal by cutting off power supply to the vehicle when the vehicle is in a parked condition.

In yet another aspect, the invention provides a system for enabling protected two-way communication between a control station and at least one remotely located module, for initiating on/off control of and end user apparatus at the location of the module, said system having communication capability with a communications host which may be linked with a commercial satellite, said system comprising: a shareable control station having a database and including electronics to send/receive information to/from a communications host, said communications host performing two-way communication with said end user apparatus; at least one remotely located electrically powered module associated with a known end user and having an assigned unique identification number (ID), said module being mounted in said end user apparatus which is in the form of a vehicle which is to be selectively protected, tracked, and controlled by an on/off switch, said module including: (i) a circuit which generates a time-varying security code which changes at predetermined time intervals, the security code identifying the module and its end user owner; and (ii) electronics to send status and motion information signals from the module to the shareable control station; said shareable control station having circuitry to read said time varying security code and said status/motion information signals and send control signals to the remotely located module in response to the status/motion information signals to cause the vehicle to be turned on/shut off as desired.

In yet another aspect, the invention provides a system for enabling protected two-way communication between a control database and at least one remotely located module, said system having communication capability with a communications host which may be linked with a commercial satellite, said system comprising: a shareable control station having a database and including: electronics to send/receive information to/from a communications host and to encrypt/decrypt information while communicating with said communications host; at least one remotely located module which has an assigned unique identification number (ID) and is able to send/receive information to/from said communications host; circuitry in said control station to read and identify said unique identification number (ID) of said at least one module before accepting information from said module; and electronics in said module using a time varying algorithm to generate a changing password which changes at a controllable time interval, for enhancing security in communication with said at least one module; said module selectively including: a resynchronizing means to resynchronize the module ID at power restoration after a power loss to the module; a sensor to sense a physical condition parameter of said remotely located module to generate a signal to be sent to said control station; and means to selectively encrypt/decrypt information which is sent out from/received by said at least one module, while communicating with said control station.

In yet another aspect, the present invention provides a system for enabling protected two-way communication between a shareable control database and one or more remotely located protector modules, said system having communication capability with a communications host which is linked with a commercial satellite, said system comprising: a shareable base station control database including means to send and receive signals and information to and from a communications host; means to selectively encrypt and decrypt signals and information while communicating with said communications host; means to create, read, and modify an electronic identification number (EID) to be used for communications between the base station and each said protector module; means to read and identify a unique ID of each protector module before accepting signals or information from said each protector module; and means to automatically retry communicating with a selected protector module if it is sensed to be temporarily out of reach; each said remotely located protector module selectively including: means to hold in memory its unique ID, and means to resynchronize its ID after power restoration subsequent to a power failure; means to automatically initiate at least one signal communication from said each protector module to the shareable base station control database after each power restoration after interruption; sensor means to sense selectively a location, or a physical condition parameter of said each protector module as desired; access to power supply for operation of each protector module; antenna means for sending and receiving signals and information; and means to selectively encrypt and decrypt signals and information which are respectively sent out and received.

In a further aspect, the invention provides a system for supporting a protected two-way communication between a control station database and a selected one of a plurality of remotely located protector modules, said system having communications capability with a communications host which is linked with a satellite, said system being adapted to protect a remotely portable/movable unit against unauthorized movement or theft, said movable unit being fitted with one of said plurality of protector modules, said system comprising: a shareable control station database, including means to send/receive information to/from a communications host; means to encrypt/decrypt information while communicating with said communication host; and means to read and identify a unique identification number (ID) of said selected protector module, and a remotely located protector module which has an inherent assigned ID and including resynchronizing means to resynchronize said one protector module ID at power restoration after a power loss; a gyration sensor built into said one protector module, said gyration sensor generating a signal when said remote movable unit is picked up by an unauthorized person; means built into said one protector module to send a generated signal to said control station database; global position sensor means built into said one protector module; and means to selectively encrypt/decrypt signal information which is sent out from/ received by said one protector module, whereby when said remote portable/movable unit is picked up and moved by an unauthorized person, said control station database is informed of the move, and a location of said remote portable/movable unit when moved can be tracked down by said control station database by reading signals from said global position sensor means.

BRIEF DESCRIPTION OF THE DRAWINGS

The invention may be understood in greater detail from the following description of a preferred embodiment, given by way of example, and to be understood in conjunction with the accompanying drawing which is not to scale and is presented only for purposes of illustrating the principles of the invention, wherein.

DETAILED DESCRIPTION OF PREFERRED EMBODIMENTS OF THE INVENTION

A preferred embodiment of the invention will now be described with reference to a pictorial overview of a system which, by remote control, can turn on/off an end user apparatus after ascertaining that it is safe to do so. A control station contacts a communication host which may be a commercial unit, to send remote signals to a module which is installed at a remote location where a control function needs to be performed. The module is illustrated in this preferred embodiment as "Trident Protector", and the end user apparatus is shown pictorially as a lightbulb which will be turned on/off. The invention selectively uses data encryption, and a time varying code to identify the specific protector unit with which the control station TBS makes contact.

Figure 1:
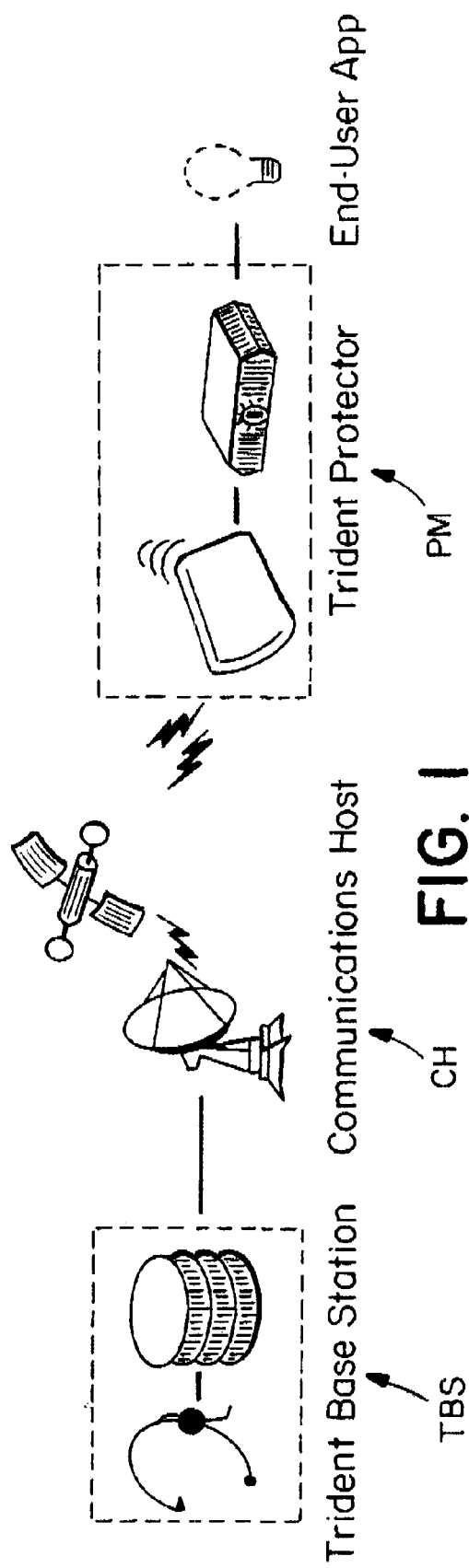
FIG. 1 is a pictorial overview of the components in the inventive system, and the manner of their interaction.

More particularly, FIG. 1 illustrates an overview of an embodiment of the present invention showing a base control station TBS, a communications host CH, a remote module PM, and an interacting end user apparatus. The base control station generally consists of a distributed database and a communication control center. The base control station maintains the security codes of all modules, i.e., protector modules which are in the field, and may be associated with different customers. The base control station TBS and each associated protector module have clock signals which need to be synchronized for operation as desired. Customers who wish to check the status of a field located protector module or send a command signal to a field located protector module can do so through the base station TBS. The base station TBS enables and manages all two-way paging and communication to the protector module PM through the communications host CH. The base station TBS can periodically collect status information from any assigned protector module, or receive any sensor information from the protector module. It can also send a command to the protector module to control a connected gadget or appliance. The base station TBS includes a shareable database system such as an Oracles® system, and also keeps track of customer status and billing information. All the communication which the base control station TBS manages is done through a communications host operated by SkyTel®, for instance. The base control station TBS is preferably operative around the clock every day. It could be operated by personnel, it could be automated, or it could be a combination of the two. A given geographical area may be divided into zones with each zone provided with a base control station TBS which interacts with and controls its assigned protector modules.

The base control station communicates with the communications host CH using software and hardware which are developed to cater the needs of the system illustrated. As aforesaid, SkyTel® can be used as the provider of both communications host(s) and the necessary software development system and the software to provide high level hand-shaking and communications software operating between the base station TBS and the communications host CH. Any other alternative provider may be used as well instead of SkyTelo®.

Each protector module has an ID which is normally not altered. The protector module ID may be entered into the module as a write-once memory which could either be a programmable ROM or a write-once memory within the processor running the security algorithm. Advantageously, in the system as described, the ID is not made known to the owner of the module, but is tracked, recognized, and identified by the control station TBS as being associated with a specific customer. If the ownership of a protector module change, the ID still remains the same, but the information regarding the new owner is entered into a control database at the TBS.

The protector module or remote unit PM, as illustrated, is capable of carrying on a two-way communication with the communications host CH. Motorola®, for example, has the capability of manufacturing protector modules for this inventive system. The modules may be multi-chip modules (MCM) and have several integrated circuits and other elements in the same casing which may be made weatherproof. The protector module, if desired to perform an on/off function, may be connected to an end user apparatus, the operation of which can be controlled at will by initiating a signal at the base station TBS. If it is desired that the protector module be installed in a movable unit and is required to perform as a motion detector, the protector module would be provided with a motion sensor. As briefly discussed earlier, if protection is desired for a portable unit against the unit being picked up physically and transported against the customer's will, a motion sensor which senses a gyrating or an arcuate movement to generate a signal can be provided. Several end user applications are envisaged in the system, including global positioning system (GPS) sensing. If the protector is fitted with GPS, then, whenever the base station desires to check the location status of the protector module (which also is the location of the unit in which the protector module is fitted), the base station initiates a GPS location status check signal to which the protector module responds through the intermediary of the communications host. The response of the protector module as to its GPS location is conveyed as a signal to the base unit TBS. All signals and all communications in the inventive system are protected as described in the following paragraphs.

Security

The protector module is fitted with a microprocessor which is programmed with a security algorithm to act according to a time-varying algorithm which changes a password every 60 seconds, for example. The same microprocessor may also be used to coordinate and manage other features and functions of the protector module.

Each protector module has an inherently assigned identification number (ID) which is verified and matched by the base station TBS each time a message is received from the protector module, and each time the protector module receives a specific message directed to the protector module in question. Besides, the system makes sure that communication between the base station and a specific protector module matches a predetermined electronic identification number (EIN). Thus, communications between each protector module and the base station are very difficult to be interrupted or tapped. The time varying password referred to supra ensures tamper-proof wireless communications, even in the event someone manages to clone an EIN. The security algorithm, at power restoration to the module after a power interruption not only resets the module ID, but also resynchronizes the EIN.

The security algorithm referred to above, as used in this invention, has the ability to compensate for relatively small time skews which might occur between the clocks of the protector module and the base station TBS.

Each protector module, as stated earlier, has its own identification number assigned to it at the time of its assembly, and assists for purposes of maintaining security.

Protector Module

Figure 2:
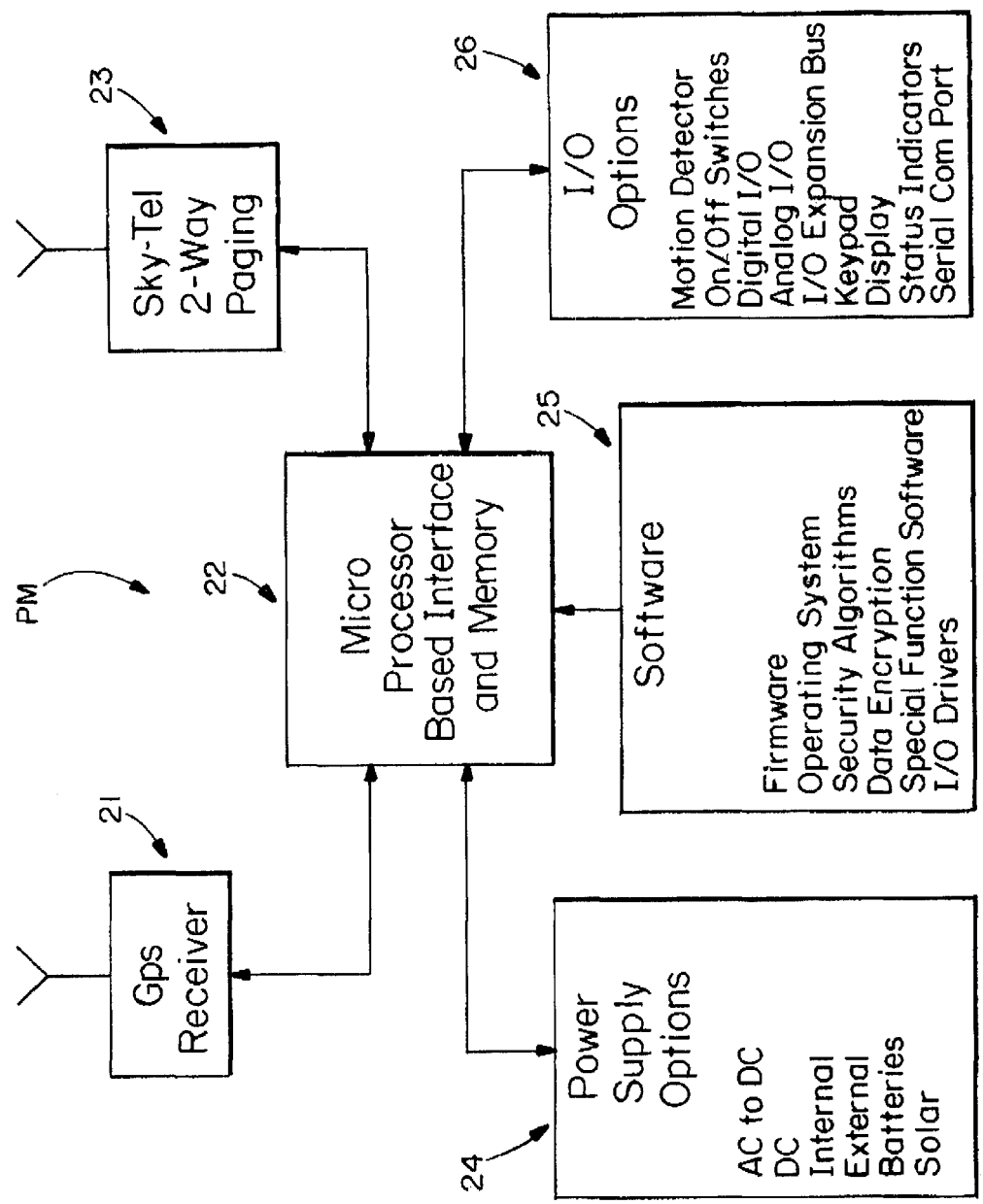
FIG. 2 is a diagrammatic view of a protective module used in the invention, showing different choices of functional elements constituting a protective module or cooperating therewith.

The protector module PM, also referred to as the remote unit herein, is illustrated in FIG. 2 in a functional and diagrammatic form. The protector module PM incorporates a GPS receiver 21, a two-way paging unit (e.g., SkyTel®), and a microprocessor-based component interface memory 22 interacting therewith. Interacting with the component interface memory 22 are a power supply unit 24, software and related elements 25, and an input/output option group 26.

The power supply unit 24 could comprise a DC supply where available, or one or two expendable or rechargeable batteries. Alternatively, where AC power is available for the protector module, the power supply unit 24 could comprise an AC to DC unit, internal or external to the protector module. Where the protector module is exposed to light, solar panels mounted on the protector module casing can be used as a power source.

Several input/output options are envisaged in the power module. In the event the protector module is intended to be connected to perform an on/off switching function, the protector module is fitted with a receptacle to receive a power input for an auxiliary circuit or end user apparatus application as illustrated pictorially in FIG. 1, and an outgoing powerline to be connected to the apparatus to be controlled. If the protector module is intended to function as a motion detector, the protector module is provided with a motion sensor. The motion sensor, per se, could be of the type responsive to linear or any kind of movement which can be used to generate signals for motion detection. Specifically, where the motion to be detected includes an arcuate motion such as what occurs when an article is picked up, a sensor which responds to gyration or arcuate movements is assembled with the protection module. It is conceivable that the protector module can have digital or analog or hybrid input/output capabilities. Details of such arrangements are not critical to the understanding of this invention and are not dealt with in more detail herein. The protector module may incorporate an input/output expansion bus if so desired.

As to indicators/controls at the protector modules, there may be a display of any suitable form, e.g., LCD, LED, or others. There may also be a keypad optionally provided at the protector module in the event a customer wishes to send signals needed from the protector module to the base station TBS. The protector module may incorporate other input/output options not specifically referred to hereinabove, depending on any specific application.

Unit 25 illustrated in a diagrammatical fashion in FIG. 2 incorporates firmware and software relating to, but not limited to, operating system, security algorithms, data encryption, special function software, and input/output drivers. In order to identify the authenticity of a customer to whom a specific protector module is assigned, a security algorithm such as RSA (Rivest, Shamir, Adelman) is preferably used. It is conceivable that other forms of encryption, e.g., Pretty Good Privacy (PGP) or Secure Sockets Layer (SSL) with suitable needed modifications may be used.

The protector module PM can be customized to include whatever components become necessary for the particular application, e.g., physical location sensing or GPS tracking, or physical parameter sensing (temperature, pressure, vibration, etc.) or anti-theft protection (motion sensor) or a totally new application where signals can be generated. The module can be sealed if necessary in a plastic enclosure with only an antenna and terminals showing. The antenna may be built into the module if so desired.

Several of the components in the protector module PM, including the battery pack and physical parameter sensors can be off-the-shelf components. The protector module PM can additionally be designed to withstand deleterious/adverse effects of temperature, vibration, or excessive humidity and other extreme conditions.

Operation

The two-way paging system built into the present system with optional auto-retry capabilities is capable of operating to reach locations where normally wireless communication is difficult. Where a protector module PM is installed as part of an anti-theft system in a vehicle, significantly, the status of the module as to its travel speed or velocity, and its GPS bearings are ascertained before initiating turning off the vehicle. This way, an undesirable situation such as turning off a stolen vehicle while it is in motion on a highway, can be eliminated.

Advantageously, a Cornell List Processor (CLP) serial data protocol can be used to process data for the protector module. The CLP protocol is supported with speeds up to 9600 bps, which is beneficial for purposes of the present invention. In order to handle varied types and lengths of messages including the requirements of the security algorithm, preferably some form of buffer or universal asynchronous receiver/transmitter (UART) arrangement is used in connection with the transmission of data from the protector module.

For all the typical capabilities of the present system including on/off electrical control in a household setting (e.g., lights, range or oven, TV or VCR, or microwave), digital/analog status or sensing, GPS location/coordinates and motion detection (velocity, and/or direction of travel), the system uses two-way communications between the protector module and the base station using a security algorithm with a processor or firmware to ensure that only the intended modules to which signals are meant to be directed, act upon the commands/data. The commands and information to be sent/tracked can be tailored to suit an individual customer's needs.

A unique feature of the present system is a time-varying security algorithm which checks for a correct but changing ID at every communication. With the use of the time-varying security algorithm, even if the EIN of a communication can somehow be cloned by an intruder, the communication can still be tamper-proof. To run the security algorithm, a suitable combination of EEPROM/DAL/RAM may be used. Preferred examples of processors which can meet the required function include processors with multiple serial interfaces from Motorola® 68 K family or the Intel® x86 family. Other suitable processors may be used as well.

In conjunction with determining the hardware needed to run the security algorithm, an effort is be made in the inventive system to intelligently embed the security algorithm into the communication data stream between the protector module and the base station. From a system's architecture viewpoint, and from a review of the security algorithm, it is known that the security ID can be placed near the beginning of the data stream so that authentication can occur before processing of data/commands. The number of bits preferably must be chosen wisely since too many bits creates needlessly long data transmissions while too few bits may limit the number of protector devices manufactured using this current data stream architecture. A security ID using 128 bits is currently proposed as the total security ID length where 32 of the 128 bits are devoted to the time-varying ID and the balance of the bits to the fixed ID, as a preferred example.

The present system offers the following possibilities in a very efficient manner with a high level of security:

1.) Transmission/Reception of moderate length data messages between the base station and a field located protector module or a remote unit on a 24-hour per day basis;
2.) Broadcasting selectively either to a group of modules or individual protection modules;
3.) Easy telemetry control;
4.) Operation possible using existing two-way paging infrastructure;
5.) Built-in or external antennae can be used;
6.) Use of serial transistor-transistor-logic (TTL) interface and Cornell List Processor (CLP)/serial data protocol possible with advantages.

GPS Coordinate Averaging

With specific reference to information processing relating to the GPS receiver 21 in FIG. 2, it would be desirable to minimize the usually occurring continuous shifts in the GPS coordinates, which are built into the GPS as an error function. The inventive system addresses the issue by providing an algorithm to mitigate the instability and shifts in the GPS coordinates. The algorithm creates a time-averaged set of coordinates that can minimize GPS coordinate shifts when a GPS system is stationary. Such an algorithm is useful, for example, when a car is parked in a parking lot for a period of time. The longer the GPS system is stationary, the better the GPS coordinates become.

The algorithm has multiple levels of functionality based on binary encoding methods. Use of this binary encoding has a number of advantages compared to other algorithms currently used to resolve the shifting GPS coordinates. First, the binary algorithm simplifies the mathematics involved in calculating and storing the results. Many algorithms perform real division and multiplication that require significant numbers of manipulations and/or wide datapaths on correspondingly expensive processors. This algorithm works well on 8-bit processors with the limited or no multiply/divide capability. The algorithm also divides the length of time used in the average algorithm into multiples of 2 so that levels of accuracy are well defined and previously collected known good data can be easily retrieved should real movement of the GPS system begin.

The main part of the algorithm takes the GPS coordinates in binary format (1s and 0s), performs a binary addition of a certain number of samples, and shifts to the right the result by a predetermined number of bits. For example, the smallest figure worth averaging is four samples. In this case, the four samples are added and the result is shifted to the right by 2 bits to create the final averaged coordinate. The next average would take the sum from the previous 4 coordinates and add the 4 newer coordinates to generate the sum for eight coordinates. The resulting sum is then shifted right by 3 bits to create the final averaged coordinate for the group of eight samples. The same algorithm is extrapolated for each group of samples that is twice as large as the previous sample, remembering to shift the final sum appropriately to the right for the final averaged coordinate. Each of the final averaged coordinates is then stored in memory for easy retrieval at appropriate times.

Figure 3:
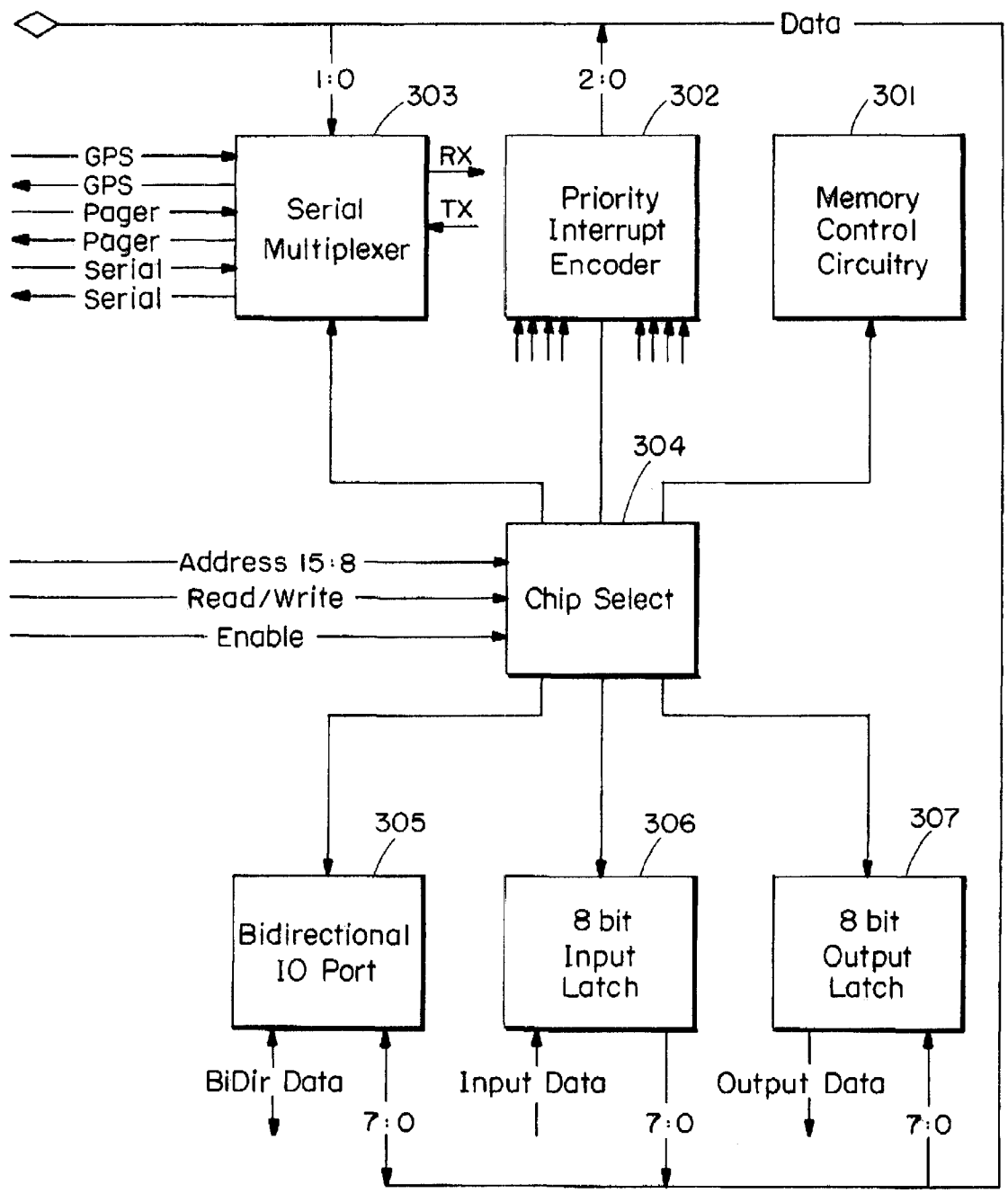
FIG. 3 is a block diagram of a field programmable gate array.
Figure 4:
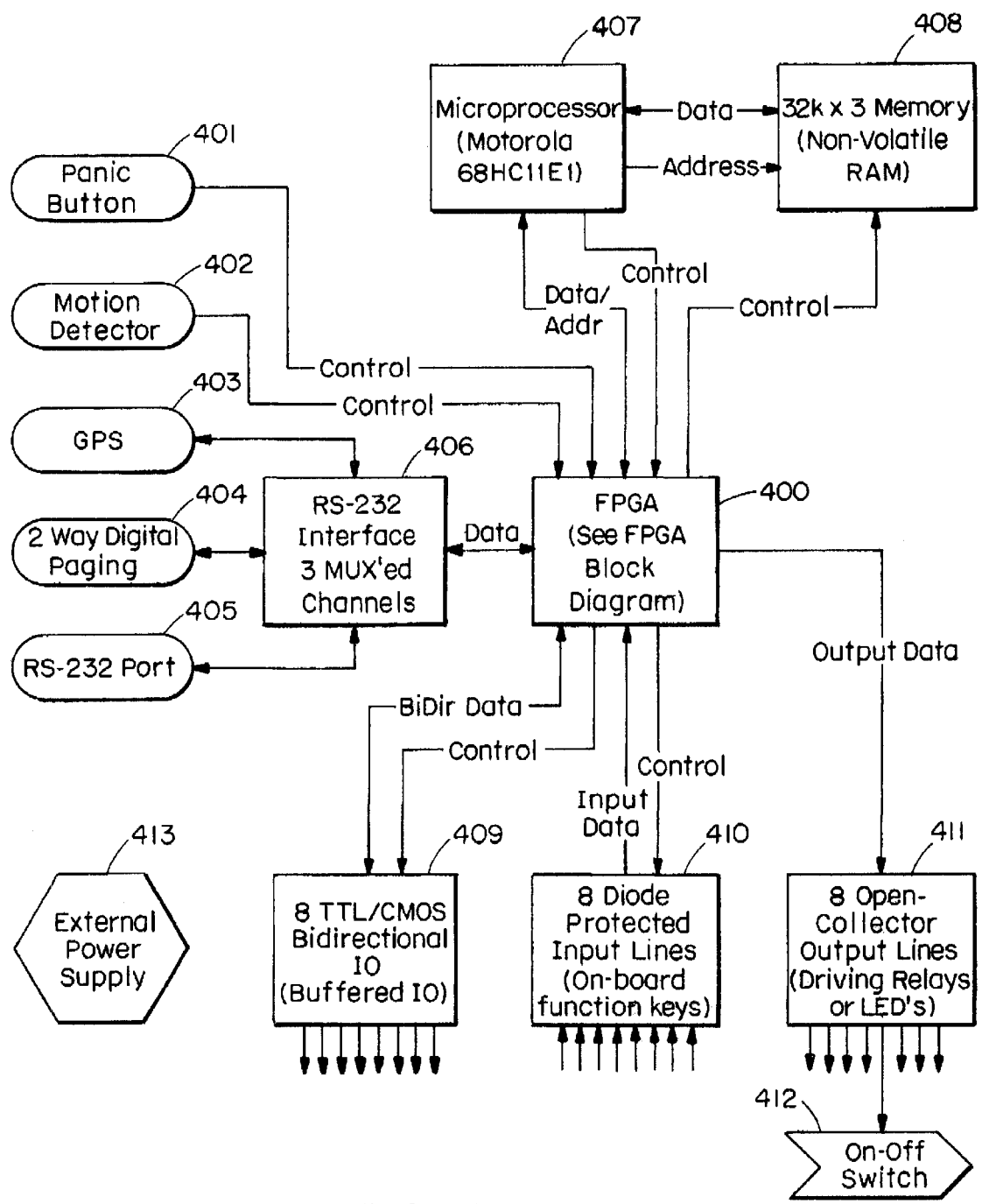
FIG. 4 is a diagrammatic illustration of a microprocessor based interface and memory.

FIG. 4 is a diagram illustrating electronics in a protector or remote module in the form of an exemplary microprocessor-based interface and memory. At the heart of the diagram of FIG. 4 is the Field Programmable Gate Array, (FPGA), which is illustrated in greater detail in FIG. 3.

FIG. 3 is an exemplary illustration of a Field Programmable Gate Array (FPGA), which is referred to as an FPGA block diagram. The FPGA as illustrated comprises a chip select unit 304 which interacts with bidirectional input/output port (I/O) 305, an eight-bit input latch 306, and an eight-bit output latch 307. Also cooperating with chip select 304 are serial multiplexer 303, priority interrupt encoder 302, and memory control circuitry 301. As shown, signals which are sent into chip select include address signals, read/write signals, and enable signals. Outgoing signals are directed from chip select 304 to serial multiplexer 303, priority interrupt encoder 302, memory control circuitry 301, bidirectional I/O port 305, eight-bit input latch 306, and eight-bit output latch 307. Additionally, unit 406 accepts input data, unit 307 sends output data, and unit 305 has bidirectional data capabilities. The bidirectional data capabilities are used by the FPGA in interacting with unit 409 as shown in FIG. 4. The output data emerging from unit 307 shown in FIG. 3 enters unit 411 as shown in FIG. 4.

Functionally, the serial multiplexer 303 shown in FIG. 3 handles information pertaining to GPS, two-way pager, and serial multiplexer information.

More specifically, the remote module has the capability of sending out GPS signals, pager information, and other signals through antenna 308 for receipt by the control center. A further application of the present invention consists in its use in a rental car for instance in which a remote module is installed and programmed using, among other circuit elements, the chip select 304 and memory control circuitry 301, to automatically send GPS signals at predetermined time intervals to the control station (TBS in FIG. 1). This way, it is possible to track the location of a selected rental car on a continual time basis, to keep a log of the rental car movements and geographic locations, without the control station having to interrogate the remote module.

Advantageously, in the present invention, at power restoration to the remote module after a power failure or interruption, the security algorithm as referenced supra restores the module ID and resynchronizes the module in the control station to follow the time-varying code.

With specific reference to FIG. 4, the FPGA 400 receives inputs selectively from microprocessor 407, non-volatile memory 408, panic button 401, motion detector 402, global positioning system 403, two-way digital paging unit 404, interface multiplexer 406, optional on-board function keyboard 410, and power supply 413. The FPGA unit 400 also sends out data as required, to communicate with bidirectional buffered input/output unit 309, keyboard 410, and a set of relays or LEDs 411 which receive output data, and an on/off switch 412 which might receive "turn off" or "turn on" commands from the FPGA unit 400 at switch 411. Depending on which application the remote/field located protector is intended for, and depending on which functions a user/customer wishes to combine for a specific protector, selected elements from the panic button 401, motion detector 402, and global positioning sensing 403 can be deployed.

With continued reference to FIG. 4, the panic button 401 can be any electrical contact switch which might be spring loaded or otherwise, which will send a panic signal to the FPGA so that appropriate emergency action may be initiated. The panic button may be of the type which can be manually operated if the protector location is close to personnel. Otherwise, the panic button could be made to be remotely operable as necessary.

Motion detector 402 used herein is generally of the type that generates a control signal responsive to a movement, e.g., a linear movement caused by the protector unit being moved (unlawfully) such as in the event of theft. An example of this may be one where the protector unit is installed in an automobile, a vehicle of any kind, or other apparatus which is intended to be protected against unlawful movement/theft. Alternatively, the motion detector could be of the type which sends a control signal responsive to arcuate lifting movement.

More specifically, where the system of the invention is used for anti-theft automobile protection, the motion detector 402 may be modified to sense the motion status of the automobile and a parked condition of the automobile. Typically, an automobile is pre-wired with circuitry which can sense whether the vehicle is in "park" or "drive". The same circuitry can be adopted for interaction with the detector 402 of the remote module to generate signals corresponding to the vehicle parked status and the "vehicle in drive" status. Thus, in the event of a theft which is reported by the owner to the control station, an automobile can be remotely incapacitated by the control station after ascertaining that the vehicle/automobile is indeed in a parked condition. If, on the other hand, the motion status signal provided by the modified sensor 402 indicates the vehicle to be in motion, then, either the remote module or the control station can be programmed to wait until the vehicle is sensed to be in a parked condition (or in any other condition deemed safe, e.g., a manual transmission vehicle in gear but not in motion), before turning off the power supply to the vehicle to avoid stopping the vehicle while in motion in a dangerous situation such as on a highway. Microprocessor 407 can be used to control and perform this function.

The unit 403 which is a global positioning system (GPS) can be similar to units which are commercially available, but, the functioning of the GPS includes two-way communication and is modified in the context of the present invention by preferably using a special GPS coordinate averaging algorithm as was explained hereinbefore. Preferably, the GPS unit 403 sends a signal to FPGA 400 through multiplexer 406.

The two-way digital paging unit 404, also capable of two-way communication, sends its signal preferably through the multiplexer 406.

As shown, an RS 232 multiplexer channel interface 406 and an RS 232 port 405 are used. Alternatively, other multiplexers and compatible ports may be used.

As illustrated in FIG. 4, a microprocessor 407 is used to interact with the FPGA unit 400 and other components including those shown in FIG. 4. Assisting the operation in general and in particular the microprocessor 407, is memory 408. In the illustrated embodiment, the microprocessor is a Motorola® 68HC11E and the memory is a non-volatile 32 k x8 RAM. Other equivalent or similar microprocessors and compatible memories may be used, instead.

The arrangement in FIG. 4 also includes a buffered input/output (I/O) unit 409, which in its preferred form, is an 8TTL/CMOS bidirectional I/O unit. Other equivalents can be used as alternatives. The protector unit preferably includes on-board function keys 410, which have eight diode protected input lines as shown. Each of the units 409 and 410 is capable of bidirectional data communication with the FPGA unit 400 and is capable of receiving control signals from the FPGA unit 400. Unit 411 additionally is capable of sending a control signal to on/off switch 412, which can turn off or turn on electrical supply to an appliance or other apparatus.

Figure 5:
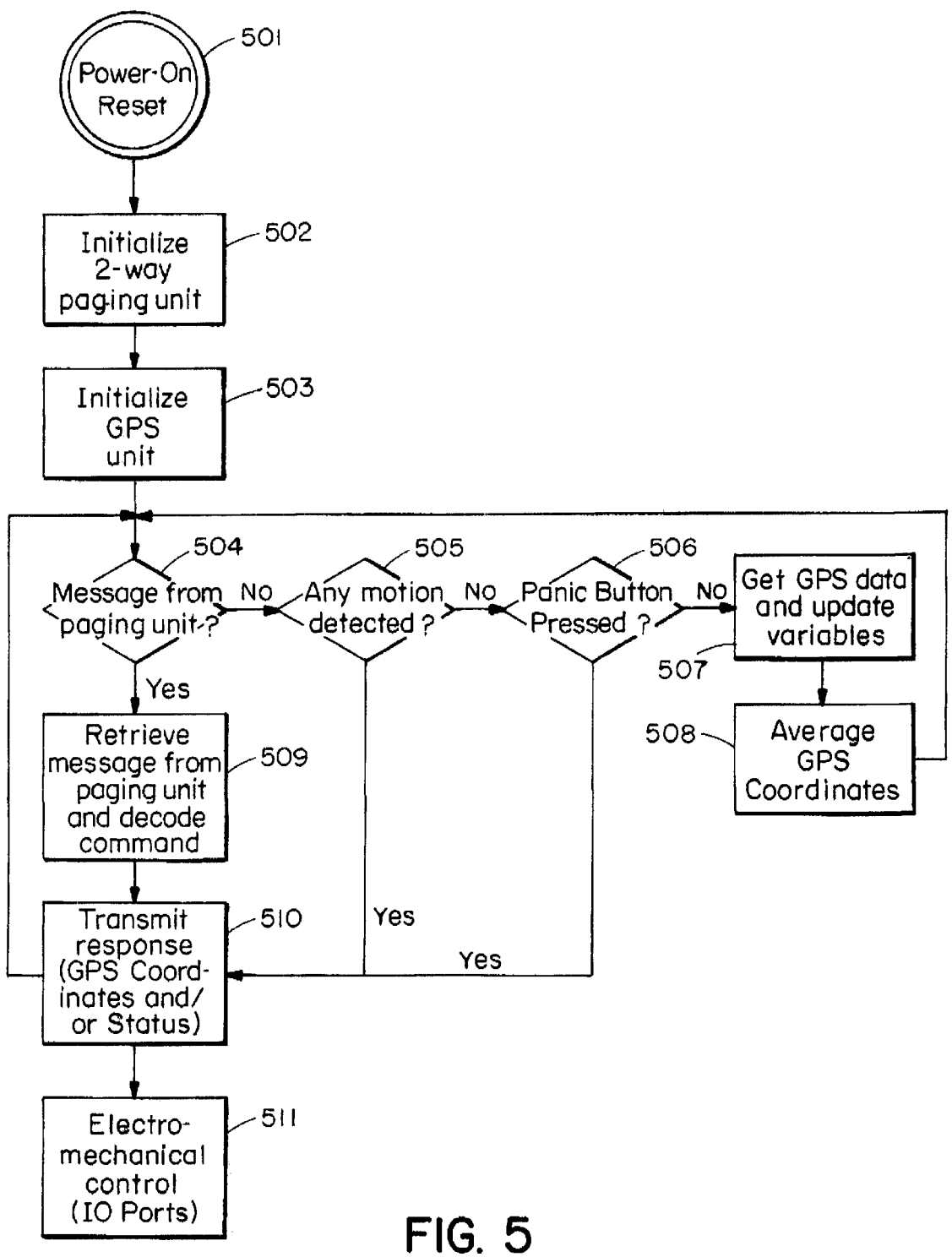
FIG. 5 is a flow chart of a typical function cycle of the system of the present invention.

The arrangement illustrated in FIG. 5 includes an output unit 411 containing eight open collector output lines. As shown, unit 411 has driving relays or LEDs for indicating the status of operation of the system. Any other output indication in lieu of the LEDs may be used as an alternative.

FIG. 5 is an exemplary flow chart of a typical operation of the inventive system. As shown at 501, the system needs the power supply to be on or the system to be reset after a power interruption and return. As shown at 502, the two-way paging unit 23 (FIG. 2) is initialized. Likewise, as shown at 503, the GPS unit 2 (FIG. 2) is initialized in order that the unit interacts with the microprocessor based memory 22 in FIG. 2 as required. Next, the system finds out if there is a message which is coming in from the paging unit 23 shown in FIG. 2. In the absence of any message from the paging unit, the system finds out as shown at 505 if there is any motion detected. It is presumed for purposes of the functioning of this inventive system that any motion which is detected is an unwanted or unlawful motion caused by an attempted theft of tampering. If the answer is affirmative to the motion detection, or if the panic button is pressed as indicted at 506, there is a response transmitted to the base station to convey either the GPS coordinates or the status of the protector unit. An electromechanical control by way of turning off/demobilizing certain equipment which is being protected can be initiated as indicated at 511. The same action by way of turning off or demobilizing equipment can be initiated even when no motion detection occurs but the panic button is pressed as shown at 506. In the event of no motion detection and no initiation of the panic button, the system simply gets GPS data, updates variables, and averages GPS coordinates to minimize the shifts in the GPS coordinates as described hereinabove. In any event, if the system senses abnormal situations as described hereinabove, the system can initiate shutting off power supply to protected equipment through I/O ports using a shut-off signal provided that shutting off power will not cause any liability as revealed by the status of the protector module, e.g., in motion or parked, which is sensed by the control system.

EQUIVALENTS

While this invention has been particularly shown and described with reference to preferred embodiments thereof, it will be understood by those skilled in the art that various changes in form and details may be made therein, without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the invention as defined by the appended claims.

What is claimed:

1. A system for remotely protecting a vehicle against unauthorized movement, by using a control station and a protection module installed inside the vehicle, the control station and the protection module being capable of remote communication with each other, wherein the control station includes:

electronics for (i) interrogating the protection module, (ii) for reading signals including a park status signal sent by the protection module, (iii) for waiting to send a shut off control signal until such time that a parked condition of the vehicle as sensed by the protection module is signaled by the protection module to the control station, and (iv) for remotely incapacitating the vehicle by turning off a power supply thereto by a control signal from the control station through the protection module responsive to the vehicle being sensed to be in the parked condition;

said protection module including:
electronics to sense the parked condition of the vehicle and to send the park status signal therefor to said control station; and
circuitry to receive the park status signal from the control center to selectively turn off the power supply to shut down the vehicle.

2. A system for enabling protected two-way communication between a control station and at least one remotely located module, and for initiating on/off control of an end user apparatus at the location of the module, said system having communication capability with a communications host which may be linked with a satellite, said system comprising:

a shareable control station having a database and including electronics to send/receive information to/from a communications host, said communications host performing two-way communication with said end user apparatus;

at least one remotely located electrically powered module associated with a known end user and having an assigned unique identification number (ID), said module being mounted in said end user apparatus which is in the form of a vehicle which is to be selectively protected, tracked, and controlled by an on/off switch, said module including:
a circuit which generates a changing password which changes at predetermined time intervals, the combination of the unique identification number and the password providing a time-varying security code which is encrypted prior to transmitting and decrypted after receiving, the security code identifying the module; and
electronics to send a park status signal from the module to the shareable control station;

said shareable control station having circuitry to read said time-varying security code and said park status signal and for remotely incapacitating the vehicle by turning off a power supply thereto by a control signal from the control station through the protection module responsive to the vehicle being sensed to be in a parked condition.

3. The system for enabling protected two-way communication between a control database and at least one remotely located module, said system having communication capability with a communications host which may be linked with a satellite, said system comprising:

a shareable control station having a database and including electronics to send/receive information to/from a communications host and to encrypt/decrypt information while communicating with said communications host;

at least one remotely located module which has an assigned unique identification number (ID) and is able to send/receive information to/trom said communications host;

circuitry in said control station to read and identify said unique identification number (ID) of said at least one module before accepting information from said module; and electronics in said module using a time varying algorithm to generate a changing password which changes at a controllable time interval, for enhancing security in communication with said at least one module; said electronic having a circuit to resynchronize the module ID at power restoration after a power loss to the module; said module selectively including:

a sensor to sense a physical condition parameter of said remotely located module to generate a signal to be sent to said control station; and means to selectively encrypt/decrypt information which is sent out from/received by said at least one module, while communicating with said control station.

4. The system as in claim 3, including a DC power supply in the protector modules, and including means to resynchronize said protector ID each time power to a protector module is restored after a failure of the DC power supply.

5. The system as in claim 3, wherein said at least one protector module is provided with a power supply source chosen from AC, AC/DC, and solar panel.

6. The system as in claim 3, wherein said sensor means is chosen from sensors which sense motion, temperature global position, pressure, vibration, mechanical stress, expansion/contraction, wind velocity, and noise level.

7. The system as in claim 3, wherein said protector module includes a receptacle to receive power input from an auxiliary circuit for controlled supply to an end user apparatus.

8. The system as in claim 3, including a panic button which can be/will be initiated to send a panic signal to said shareable control base station.

9. The system as in claim 3, which includes indicators on each protector module to indicate a status of operation of the relevant protector module.

10. The system as in claim 3, including means to place a security ID near a beginning of data stream between a protector module and said base station.

11. The system as in claim 10, where said security ID has a total of 128 bits of which 32 bits are dedicated to a time varying ID.

* * * * *

UNITED STATES PATENT AND TRADEMARK OFFICE
CERTIFICATE OF CORRECTION

PATENT NO.    : 6,657,535 B1                                                   Page 1 of 1
DATED         : December 2, 2003
INVENTOR(S)   : L. Hugh Magbie, James E. Mandry and Douglas W. Prince It is certified that error appears in the above-identified patent and that said Letters Patent is hereby corrected as shown below:

<u>Column 14,</u>
Line 62, please delete "trom" and insert -- from --.

Signed and Sealed this

Second Day of March, 2004

JON W. DUDAS
*Acting Director of the United States Patent and Trademark Office*